INVENTOR
Paul Metz

March 8, 1966 P. METZ 3,239,205
DOUBLE LANCES
Original Filed Feb. 19, 1960 7 Sheets-Sheet 2
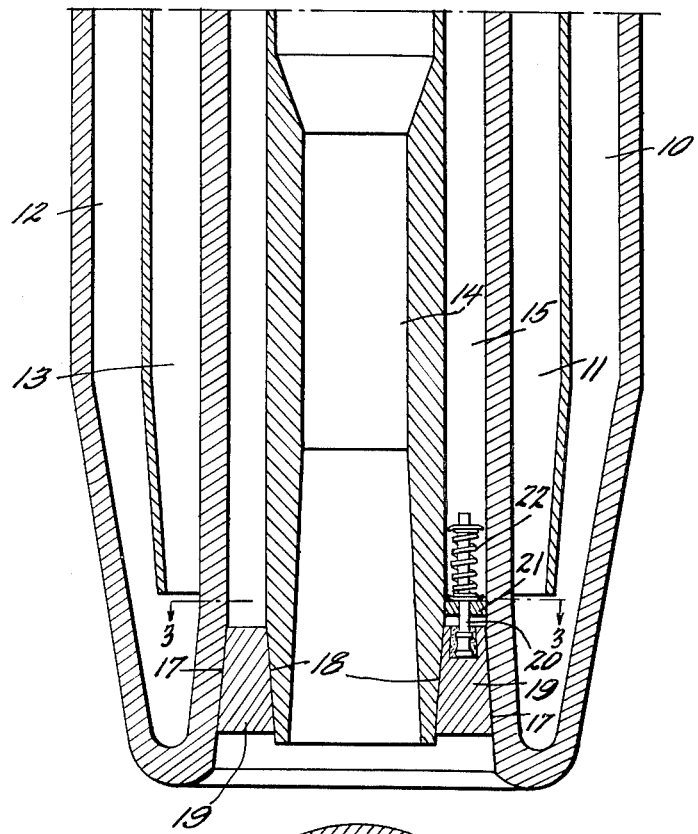
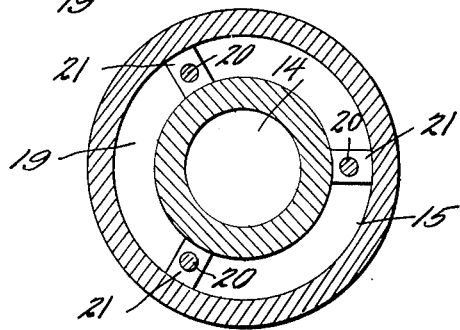
INVENTOR
Paul Metz
BY Watson, Cole, Grindle & Watson
ATTORNEYS

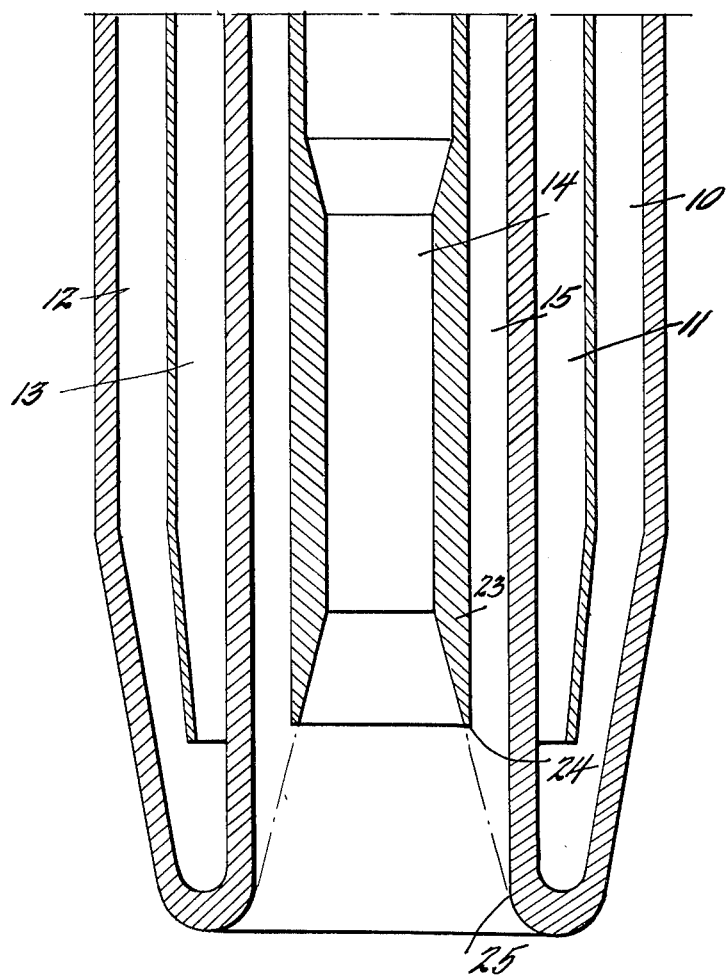

March 8, 1966     P. METZ     3,239,205
DOUBLE LANCES
Original Filed Feb. 19, 1960     7 Sheets-Sheet 4
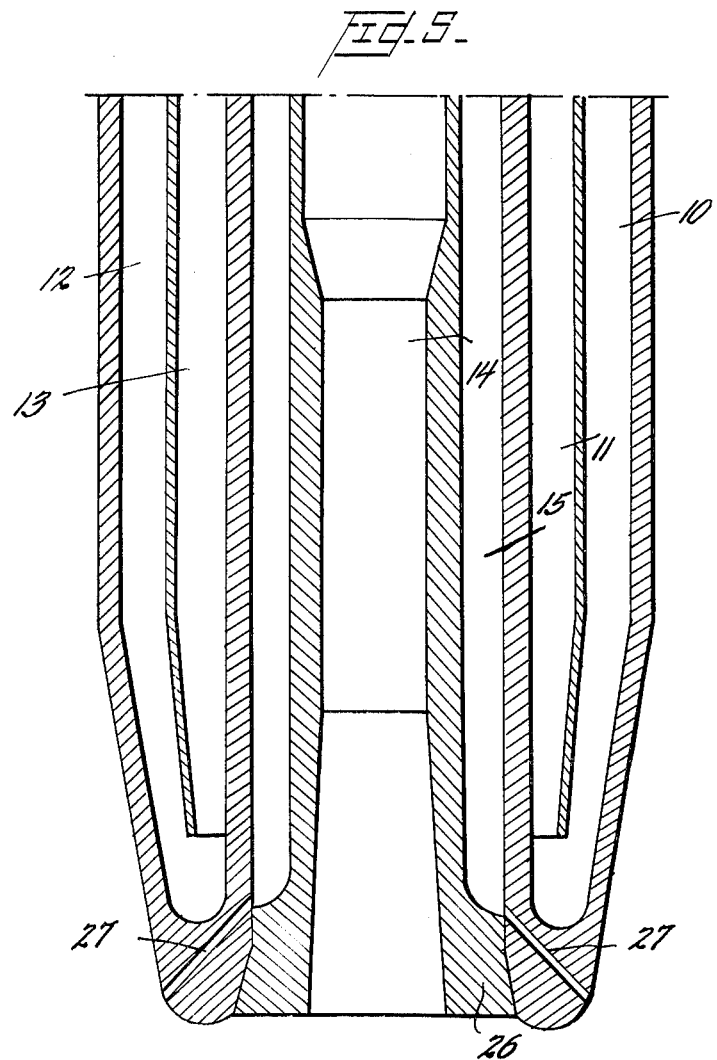
INVENTOR
Paul Metz
BY Watson, Cole, Grindle + Watson
ATTORNEYS March 8, 1966 P. METZ 3,239,205
DOUBLE LANCES
Original Filed Feb. 19, 1960 7 Sheets-Sheet 5
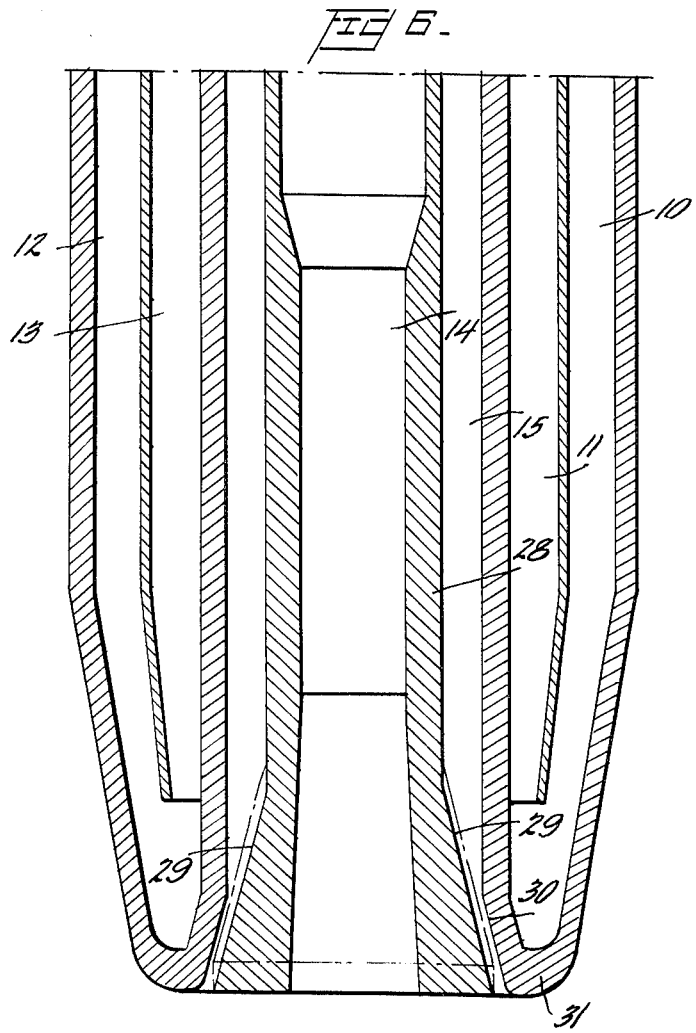
INVENTOR
Paul Metz
BY Watson, Cole, Grindle & Watson
ATTORNEYS March 8, 1966 P. METZ 3,239,205
DOUBLE LANCES
Original Filed Feb. 19, 1960 7 Sheets-Sheet 6
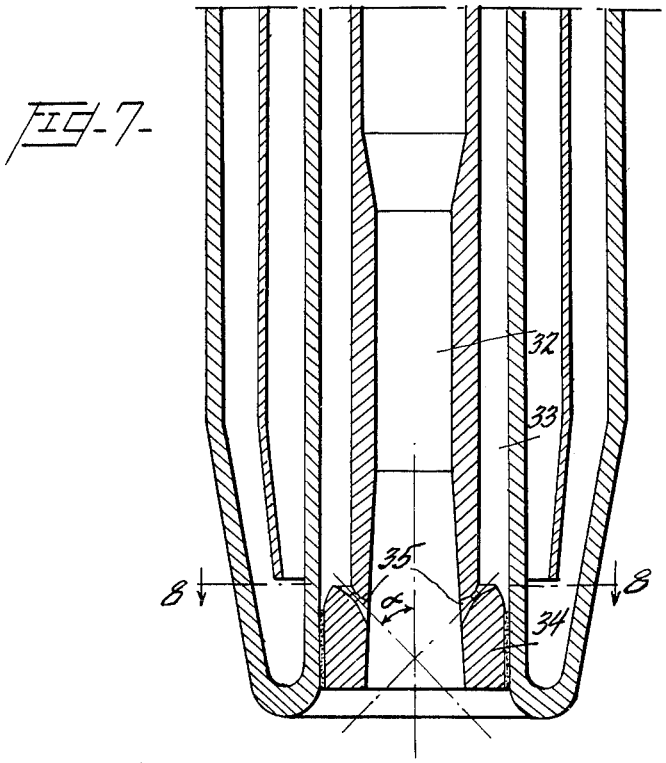
FIG-7-
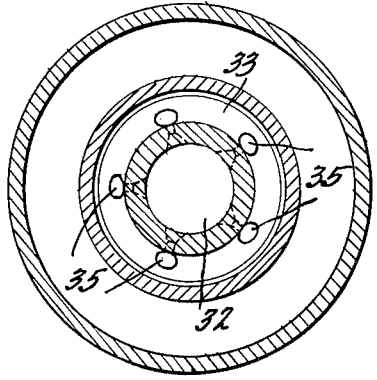
FIG-8-
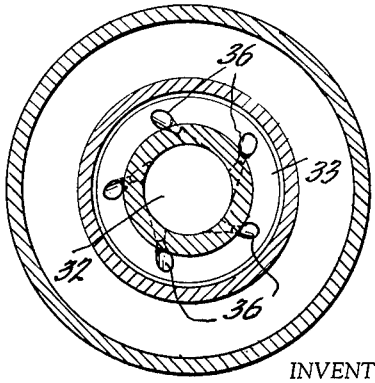
FIG-9-
INVENTOR
Paul Metz
BY Watson, Cole, Grindle & Watson
ATTORNEYS March 8, 1966  P. METZ  3,239,205
DOUBLE LANCES
Original Filed Feb. 19, 1960  7 Sheets-Sheet 7
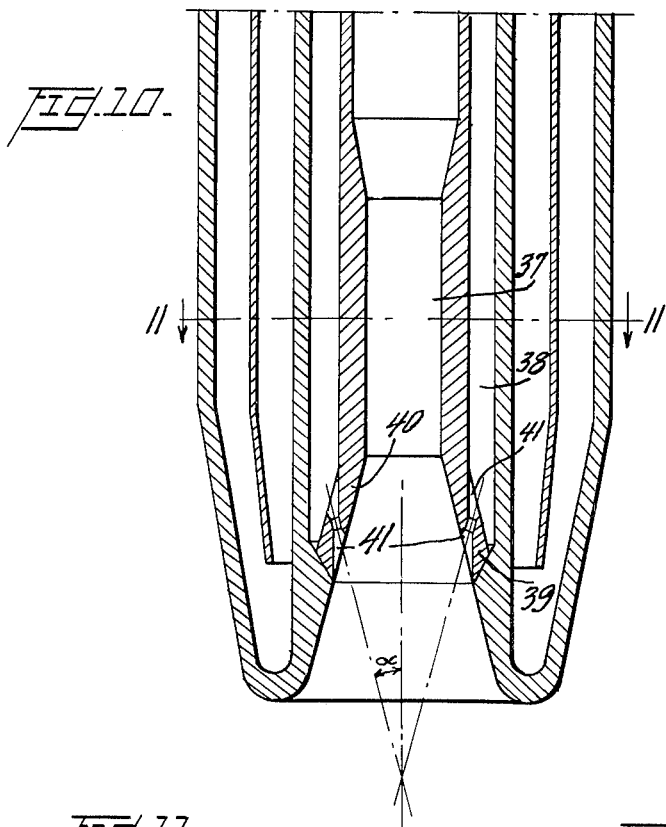
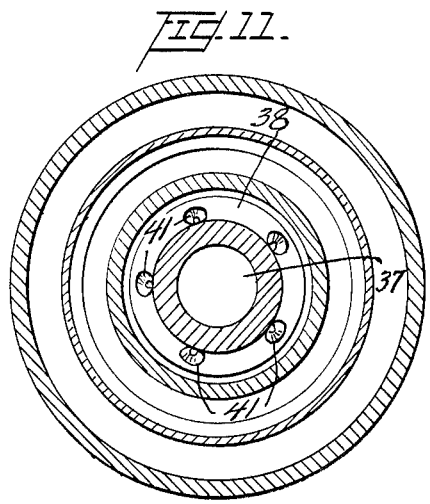
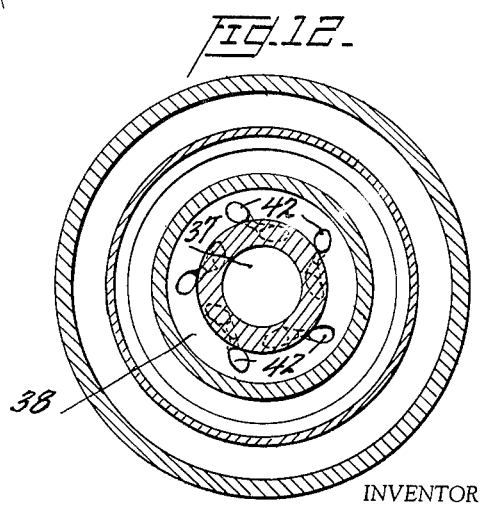
INVENTOR
Paul Metz
BY
Watson, Cole, Grindle & Watson
ATTORNEYS

United States Patent Office 3,239,205
Patented Mar. 8, 1966

3,239,205
DOUBLE LANCES
Paul Metz, Dudelange, Luxembourg, Belgium, assignor to A.R.B.E.D., Acieries Reunies de Burbach-Eich-Dudelange, Societe Anonyme, Luxembourg, Luxembourg
Original application Feb. 19, 1960, Ser. No. 9,942, now Patent No. 3,130,252, dated Apr. 21, 1964. Divided and this application July 12, 1963, Ser. No. 294,697
Claims priority, application Belgium, Feb. 20, 1959, 575,954; Mar. 3, 1959, 576,330
6 Claims. (Cl. 266—35)

The present invention relates to a device for the injection into or on top of a metal bath, of a gas which may have finely solid materials in suspension therein. Such devices are known as lances. This application is a division of my application Serial No. 9,942, filed February 19, 1960, now Patent No. 3,130,252 dated April 21, 1964.

This invention relates to a double lance formed by an inside duct through which an oxidizing gas passes, preferably at high pressure or at high speed and which may have finely divided solid materials in suspension therein and an outside duct concentric to the first and surrounding the inside duct, so that an injection of an oxidizing gas at a lighter pressure or at a lower speed is effected. The use of this double lance offers many advantages, especially in the refinement of phosphorus melts by means of oxygen having finely divided additional materials in suspension, particularly lime.

The oxidizing gas, preferably oxygen, blown in at a light pressure or at a low speed by the outside duct, causes a slag foaming and favors the dephosphorization, which increases the output of the operation and permits a better control of the method. The addition of the oxygen at light pressure or low speed furthermore permits the increase in the consumption of grapeshots, due to the combustion into $CO_2$ of the CO escaping from the bath.

However, this injection at light pressure or at low speed of the oxidizing gas by the outside duct of the double lance cannot be effected during the entire operation without risking an exaggerated slag foaming with the consequences that can result therefrom, that is an overflow of the foam out of the apparatus, and metal and slag losses. The admission of peripheral oxygen must be cut between the beginning and the end of the operation, but during the period when the gas does not pass through the outside duct, this last duct is clogged by the projections.

The present invention has for an object a device which allows to overcome this drawback.

The device which is the object of the present invention is essentially characterized by the fact that the opening of the outside duct of the lance is made so as to allow the passage of gas during the periods when injection takes place, avoiding during the periods when the flow of said gas is nil that the metal projections or the slag can reach the duct and result in clogging.

In the methods of refining the melt in which an oxidizing gas is injected at the top, as preferably pure oxygen, preferably having powdered or granulated materials in suspension, it is advantageous to be able to change the spread of the stream following the operation phase.

Thus, for example, in the method of refining phosphorus melts by means of oxygen blown in or on the top, it is advantageous to blow with a jet which is spread out at the beginning of the operation, to thus provoke the slag foaming, whereas when this foaming is obtained, it is convenient to blow with a concentrated and very penetrating jet. At the end of the operation it can be carried out, following the operational conditions, to blow either with a thin jet or a spread jet. A solution to this problem can be worked out using two or more tubes of different characteristics, but it is easy to realize the complication that would be caused by the use of several lances by injection during the same operation. It has been proposed to make these variations of spread of the jet with only one tube by modifying the pressure of the gas injected or change the distance of the nose of the tube to the bath, or by combining these two methods during the operation. It has been possible to obtain good results by these means; however, it has been limited in the variations of the spread of the jet and the method in question does not permit the change of the shape of the jet in the limits that would be desired. Furthermore, it entails operational complications. Other methods and devices have also been proposed, but in each instance these are methods and mechanical devices entailing also technological and operational complications.

The present invention has an object particularly a method to remedy these inconveniences and which allows by means of a unique lance which may be provided with a convergent-divergent device, to simply and effectively vary the jet spread necessary for properly carrying out the metallurgical operation.

A further object of the present invention is characterised essentially by the fact that when it is desired to change or vary the spread of the gas jet, this is accomplished by means of secondary gas jets. An advantageous variation of the method according to the invention consists in making the secondary injection in the main jet at the exit from the tube, preferably at the divergent level when it includes a convergent-divergent structure. The secondary jets thus destined to spread the main jet can be used with the same gas as the principal jet. However, it can be advantageous to inject by these secondary ducts a gas different from that of the main jet, and this secondary gas, on the other hand, can be injected at a lower pressure, equal, or higher than that on the main jet.

In the case of blowing in the oxygen by the main jet, it will be possible, for example, to inject stream by the secondary jets so as to avoid the production of reddish smoke.

The invention has proved particularly advantageous in the refinement of the phosphorous melt by means of an oxygen jet injected on or by the top and having in suspension finely divided powdered materials. As has been explained, it is particularly important, in this refining method, to be able to change the spread of the main jet. The invention permits the achievement of this object without any technological or operational complications. The invention of these types of devices has proved to be particularly advantageous in the refinement of the phosphorus melt by means of an oxygen jet blown in at or by the top and having in suspension finely divided lime. Providing the central duct with a tube with a long neck and/or a long divergent section, in which secondary gas can be injected according to the method of the invention, it is possible to obtain easily and at will a jet either thin and penetrating, cutting the admission of secondary gas, or spread, by admitting secondary gas.

A still further object of the invention resides in the fact that the lance for the injection of gas includes two concentric ducts, of which the outside duct is closed at its lower end to provide gas by the cross-channels in the central duct so that the gas passing by said cross-channels disturbs the central jet to broaden it. These channels can unite the peripheral duct to the central duct at any level of the tube to the end of this central duct, but they will be advantageously placed in the lower part of said tube and preferably in the divergent section thereof if it includes a convergent-divergent section. These cross-channels themselves will advantageously have the shape of convergent-divergent surfaces to speed to a maximum the gases that cross them, so that the secondary gaseous jets thus formed can cross the main jet.

The cross channels will be advantageously arranged so that the axis of the secondary jets forms an acute angle, perferably lower than 70° with the axis of the main jet in the direction of the flow of said main jet. The axis of the secondary jets may meet at the same point of the axis of the main tube, but if they do not meet, the secondary jets will preferably be tangentially directed with respect to the main jet, so as to cause a turning movement of the main jet and thereby facilitate the broadening of the latter.

Due to the structure of the device according to the invention, the spread of the jet will be a function of the quantity of gas admitted in the secondary jets. The device thus offers the great advantage of permitting a regulable spread of the main jet without mechanical means and without the use of double tubes which the outside duct is easily clogged by the projection of small metal particles or slag.

The devices which are the objects of the invention comprising a number of modifications, of which the accompanying drawings are given as examples but not limited thereto, will permit to better understand the functions and operations.

FIGURE 2 is a longitudinal section of the lance showing a modified structure,

Figure 1:
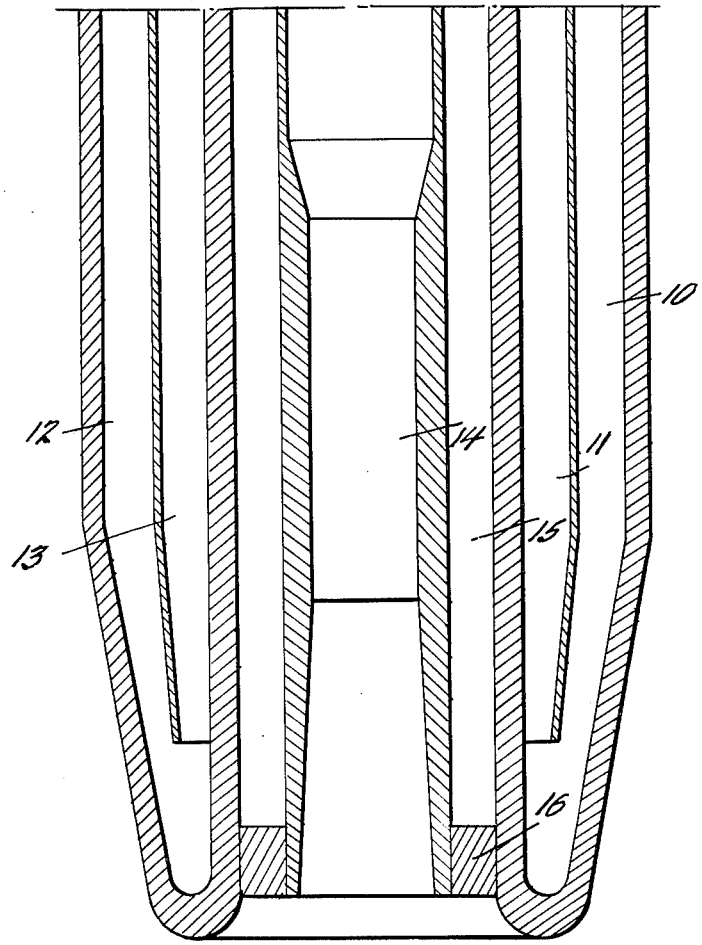
FIGURE 1 is a longitudinal section of one end of a lance.

FIGURE 3 is a cross-section taken on line 3—3 of FIGURE 2 in the direction of the arrows, FIGURE 4 is a longitudinal section of a further modified structure, FIGURES 5 and 6 are longitudinal sections of two further modified structures, FIGURE 7 is a longitudinal section of another lance structure also showing the exhaust end thereof, FIGURE 8 is a cross section taken on line 8—8 of FIGURE 7 in the direction of the arrows, FIGURE 9 is a cross section of a modified arrangement of internal orifice channels, FIGURE 10 is a longitudinal section of a further modified lance structure showing the exhaust end thereof, FIGURE 11 is a cross section taken on line 11—11 of FIGURE 10 taken in the direction of the arrows, and FIGURE 12 is a cross section of a modified arrangement of internal orifice channels.

FIGURE 1 illustrates a double lance with water circulation for cooling purposes and it comprises passages 10, 12, and 11, 13 for the water circulation, an inside duct 14 and a preipheral duct 15 concentric with the duct 14. In the structure shown in FIGURE 1, the peripheral duct 15 is closed in its lower part by means of a porous ring disc 16, which is preferably made of a refractory material, permitting by its porosity, the passage of gas from the duct 15, thereby avoiding any metal or slag projections from reaching the duct 15. The plug 16 can also be perforated with holes of a small diameter (0.2 to 5 mm.) to allow for the passage of gas.

FIGURES 2 and 3 also illustrate a double lance with water circulation, and this double lance comprises as in FIGURE 1, the water circulation passages 10, 12 and 11, 13, the inside duct 14 and the peripheral duct 15 concentric with the duct 14. In the modification of FIGURES 2 and 3, the lower part of the duct 15 is profiled to provide two frusto-conical surfaces 17 and 18 in opposite directions between which the plug or spacers 19 are located, presenting a frusto-conical section or block corresponding to surfaces 17 and 18. The spacer is normally maintained against the surfaces 17 and 18 by three bolts 20 mounted in plates 21 fixed to the outside wall of duct 14 and mounted in said plates with springs 22. When gas is admitted under pressure in the peripheral duct 15, the conical spacer 19 is forced downward, FIGURE 2, and thus opens the passage to the gas flow along the surface walls 17 and 18. When the admission of gas under pressure ceases in duct 15, the springs 22 will carry the plug 19 into closing position.

FIGURE 4 illustrates a double lance which also includes passages 10, 12 and 11, 13 for the circulation of cooling water, an inside duct 14 and a peripheral duct 15 concentric with the duct 14. In this construction a central tube 23 terminates with an end opening 24 located at a distance from the end 25 of the duct 15 so that the gas or the mixture of gas and powdered materials in suspension coming out of duct 14 will be practically tangent at 25, FIGURE 4, at the nose of duct 15. When gas is not admitted by the duct 15, the gaseous jet coming out of the duct 14 prevents the projections from reaching the duct 15, and furthermore, this modified structure has the advantage that when the admission of gas takes place through the duct 15, the central jet from the duct 14 contributes to expand toward the outside of the peripheral gas jet.

FIGURE 5 illustrates a double lance including the same elements 10, 12 and 11, 13, as well as ducts 14 and 15 as in FIGURE 4. In the modification of FIGURE 5, the duct 15 is closed at the outer end 26 by the end of the tube of duct 14 and the gas injected by the duct 15 comes out by means of the holes 27 of a diameter small enough (0.2 to 5 mm.), to avoid the formation of projections at duct 15 and which would clog it.

FIGURE 6 shows a further modified double lance including the elements 10, 12 and 11, 13, and ducts 14 and 15. The inside duct 14 is formed by a tube 28 which is movable in vertical direction following the axis of the device. An outside surface 29 of the lower part of this tube 28 is profiled as a conical section which can come to rest against the inside surface 30 of the lower part of the nose 31 of the duct 15, which surface 30 is formed as a conical section having the same angle as the conical surface 29. When gas is admitted through the duct 15, the tube 28 is lowered in the position indicated by full lines, whereby the passage between the two surfaces 29 and 30 opens as shown. When the admission of gas is cut off through the duct 15, the tube 28 is adjusted up again so that the surfaces 29 and 30 will come into contact with each other. The movement of lowering and taking up tube 28 can be carried out by any appropriate means, and if by the pressure of gas in the duct 15, the return movement may be assured by a spring, or by any other mechanical means.

FIGURES 7 and 8 show a modified lance of which the central duct 32 is surrounded by an outer concentric duct 33. The peripheral duct 33 is closed at 34 at its lower end and it communicates with duct 32 by a plurality of secondary ducts or passages 35 each having also a convergent-divergent shape. In FIGURE 7 an angle is formed by the axis of the secondary jets with the axis of the main jet as of about 45°. FIGURE 8 shows a lance in which the axis of the secondary ducts 35 meet at a point in the axis of the main jet 32.

FIGURE 9 shows a modified tube in which the axis of the secondary ducts 36 are such that the secondary jets 36 are directed tangentially to the main jet 32, so that they give it a turning movement.

FIGURES 10 and 11 show a further modified lance of which the central duct 37 has a concentric duct 38 around the main jet 37 and including a convergent-divergent portion 39 at the outlet end.

The outlet end 40, FIGURES 10 and 11, is frusto-conical and is provided with a plurality of spaced ducts and passages 41 forming the angle α at the crossing of the center axis of the passages 41. As shown in FIGURE 10, each passage 41 is in the shape of a double frusto-conical formation as might be compared to a Venturi tube. The passages may be longitudinally arranged as for example shown in FIGURE 12 in which the passages or jets 42 are arranged in a spacing similar to FIGURE 11 and also FIGURE 9, The operation of the lances as disclosed in this specification and as illustrated are believed to be obvious when the prior application is considered. As described the lances are for the purpose of treating metal baths with a gas with or without finely divided solid materials therein.

I claim as my invention:

1. A double lance for injection of at least one gas into or on top of a metal melt, including an inner tubular member defining an inside duct for passage of gas therethrough, an outer tubular member concentric with said inner member and defining therewith an outside duct for passage of gas, and means to allow gas to flow from said outside duct including the provision of at least one passage but wherein said outside duct is substantially free of clogging by metal melt or slag materials when gas is not flowing through said passage, the outside duct being closed at its lower end, and the means including cross-channels into the inside duct so that the gas passing through said cross-channels will spread the central jet, and the cross-channels being arranged so that the axis of the jets therefrom forms an acute angle with the axis of the main jet in the direction of the flow of said main jet.

2. A double lance for injection of at least one gas into or on top of a metal melt, including an inner tubular member defining an inside duct for passage of gas therethrough, an outer tubular member concentric with said inner member and defining therewith an outside duct for passage of gas, and means to allow gas to flow from said outside duct including the provision of at least one passage but wherein said outside duct is substantially free of clogging by metal melt or slag materials when gas is not flowing through said passage, the outside duct being closed at its lower end, and the means includes cross-channels into the inside duct so that the gas passing through said cross-channels will spread the central jet, and the axis of the cross-channels meeting in a common point on the axis of the inside duct.

3. A double lance for injection of at least one gas into or on top of a metal melt, including an inner tubular member defining an inside duct for passage of gas therethrough, an outer tubular member concentric with said inner member and defining therewith an outside duct for passage of gas, and means to allow gas to flow from said outside duct including the provision of at least one passage but wherein said outside duct is substantially free of clogging by metal melt or slag materials when gas is not flowing through said passage, the outside duct being closed at its lower end, and the means including cross-channels into the inside duct so that the gas passing through said cross-channels will spread the central jet, and the axis of the cross-channels being directed so that the jets flowing out of said cross-channels are tangents to the main jet.

4. A double lance for injection of at least one gas into or on top of a metal melt, including an inner tubular member defining an inside duct for passage of gas therethrough, an outer tubular member concentric with said inner member and defining therewith an outside duct for passage of gas, and means to allow gas to flow from said outside duct including the provision of at least one passage but wherein said outside duct is substantially free of clogging by metal melt or slag materials when gas is not flowing through said passage, the means including a frusto-conical plug fitting against and between the tubular members and which can be moved under the influence of gas pressure through the passages, and means to render the plug movable to and away from its position against the tubular members.

5. A double lance for injection of at least one gas into or on top of a metal melt, including an inner tubular member defining an inside duct for passage of gas therethrough, an outer tubular member concentric with said inner member and defining therewith an outside duct for passage of gas, and means to allow gas to flow from said outside duct including the provision of at least one passage but wherein said outside duct is substantially free of clogging by metal melt or slag materials when gas is not flowing through said passage, the means consisting in providing the inner tubular member with an internal surface which generatrices of prolongation meets the inner face of the outer tubular member at the end of the lance.

6. A double lance for injection of at least one gas into or on top of a material melt, including an inner tubular member defining an inside duct for passage of gas therethrough, an outer tubular member concentric with said inner member and defining therewith an outside duct for passage of gas, and means to allow gas to flow from said outside duct including the provision of at least one passage but wherein said outside duct is substantially free of clogging by metal melt or slag materials when gas is not flowing through said passage, the means including the outlet end portion of the inner tubular member provided with a tapered outer surface, the inner surface of the outlet end portion of the outer tubular member having a complementary tapered surface, and said inner member being axially movable relative to said outer member.

References Cited by the Examiner

UNITED STATES PATENTS

| | | | |
|---|---|---|---|
| 2,407,972 | 9/1946 | Aitchison | 266—23 |
| 2,417,670 | 3/1947 | Anthes | 266—23 |
| 2,829,960 | 4/1958 | Vogt | 266—34 |
| 3,045,997 | 7/1962 | Hudson | 266—34 |
| 3,059,860 | 10/1962 | Hohn | 239—423 |
| 3,128,366 | 4/1964 | McConnell | 158—27.4 X |

WHITMORE A. WILTZ, *Primary Examiner.*

JAMES H. TAYMAN, JR., *Examiner.*